(12) United States Patent
Moriya

(10) Patent No.: US 6,567,930 B1
(45) Date of Patent: May 20, 2003

(54) METHOD AND APPARATUS FOR CONTROLLING WRITING OF FLASH EEPROM BY MICROCOMPUTER

(75) Inventor: Seiichi Moriya, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/438,771

(22) Filed: Nov. 12, 1999

(30) Foreign Application Priority Data

Nov. 13, 1998 (JP) .............................................. 10-323038

(51) Int. Cl.$^7$ ................................................ G06F 11/00
(52) U.S. Cl. ........................... 714/23; 714/55; 711/103; 711/167
(58) Field of Search ..................... 714/23, 55; 710/262; 711/103, 166, 167

(56) References Cited

U.S. PATENT DOCUMENTS

| 5,923,838 | A | * | 7/1999 | Hongo | ......................... | 714/42 |
| 5,983,330 | A | | 11/1999 | Miwa et al. | .................. | 711/167 |

FOREIGN PATENT DOCUMENTS

| EP | 0 831 399 | 3/1998 |
| JP | 62-60038 | 3/1987 |
| JP | 62-152048 | 7/1987 |
| JP | 63-146137 | 6/1988 |
| JP | 7-119537 | 5/1995 |
| JP | 7-271634 | 10/1995 |
| JP | 10-269109 | 10/1998 |

OTHER PUBLICATIONS

Patent Abstracts of Japan, vol. 1996, No. 2, Feb. 29, 1996.
Patent Abstracts of Japan, vol. 11, No. 203 (P–591), Jul. 2, 1987.

* cited by examiner

Primary Examiner—Scott Baderman
(74) Attorney, Agent, or Firm—Sughrue Mion, PLLC

(57) ABSTRACT

An apparatus that make it possible for a microcomputer to execute self-programming without the occurrence of shutdown or initialization (restart) includes a flash EEPROM for storing programs and data, a monitoring circuit for monitoring program runaway and malfunction, and the microcomputer. When rewriting of the content of said flash EEPROM (i.e., self-programming) is executed via control by the microcomputer, the monitoring circuit controls output/suppression of an abnormality detection signal on the basis of an externally entered flash EEPROM write-enable signal and a monitoring-circuit operation-control signal output from the microcomputer.

6 Claims, 3 Drawing Sheets

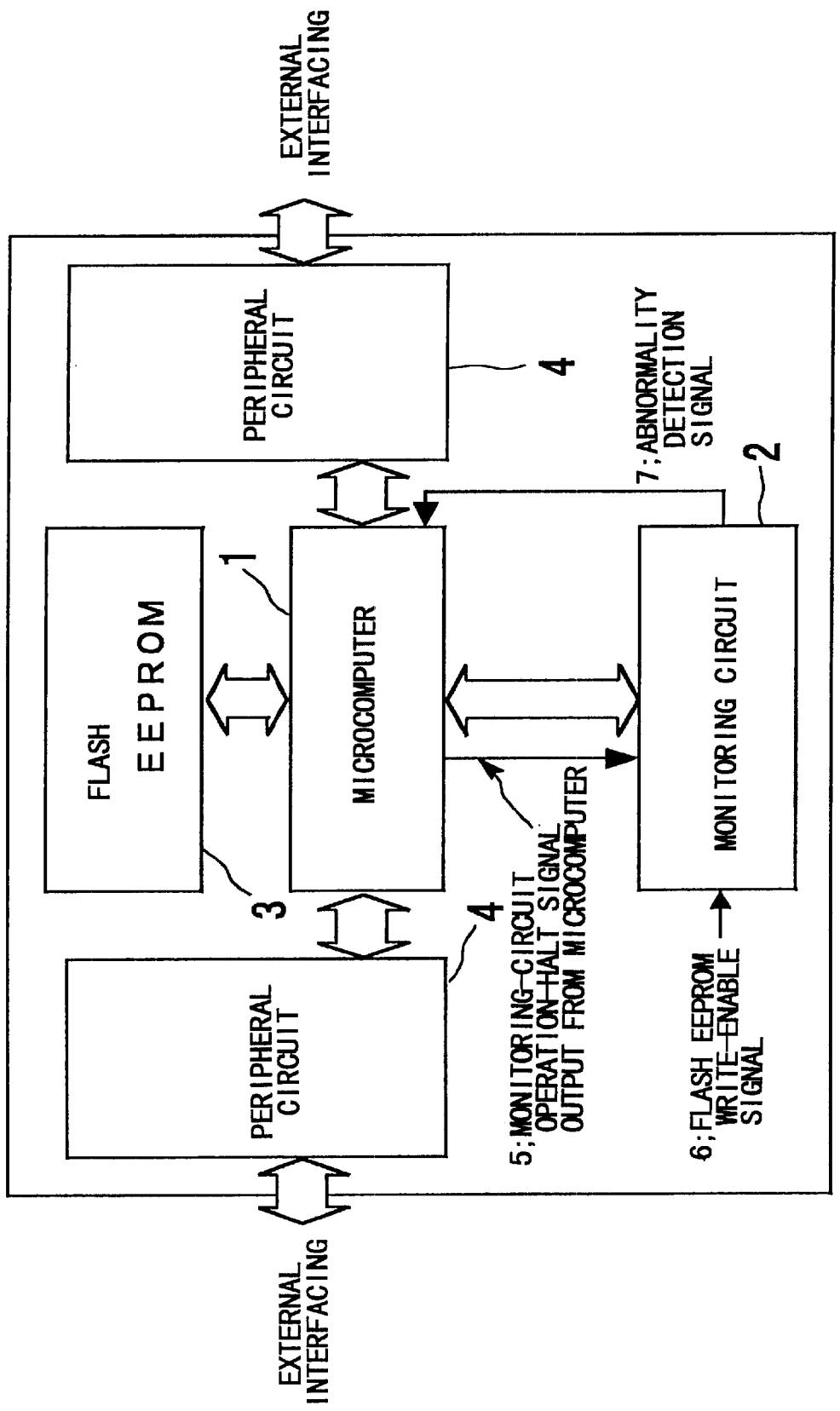
F I G. 1

METHOD AND APPARATUS FOR CONTROLLING WRITING OF FLASH EEPROM BY MICROCOMPUTER

FIELD OF THE INVENTION

This invention relates to a method and apparatus for writing a flash EEPROM and, more particularly, to a method and apparatus for writing a flash EEPROM by a microcomputer.

BACKGROUND OF THE INVENTION

A microcomputer incorporates a flash-type EEPROM (Electrically Erasable and Programmable Read-Only Memory of a flash-erasure type) to which program code and data have been written, and a monitoring circuit for monitoring program runaway and malfunction in the microcomputer. The monitoring circuit is control led by the microcomputer, which loads the program that has been written to the flash EEPROM into a RAM and then executes the program. The monitoring circuit is adapted to sense program runaway and malfunction in the microcomputer.

In a microcomputer of this kind, the microcomputer performs an operation (referred to as "self-programming") in which the content of the flash EEPROM is rewritten by the microcomputer itself. In such case it is necessary to control the operation of the monitoring circuit for the following reasons:

During normal operation, the microcomputer outputs a monitor signal or the like to the monitoring circuit periodically. If the monitoring circuit does not receive the monitor signal from the microcomputer upon elapse of a fixed period of time, the monitoring circuit outputs an abnormality detection signal to the microcomputer. Thus a reset signal for applying an interrupt to the microcomputer is output and processing such as initialization of the microcomputer etc. is executed. When self-programming is executed, however, the microcomputer performs an operation different from that specified by the program that has already been stored in the flash EEPROM. Consequently, there is no periodic input of the monitor signal to the monitoring circuit which, as a result, senses the microcomputer's rewriting of the flash EEPROM content as program runaway or malfunction. In response, the monitoring circuit issues the abnormality detection signal that initializes the microcomputer (i.e., restarts the microcomputer by reset) or causes some other special operation to occur. This means that self-programming cannot be executed.

In a microcomputer having a monitoring circuit that monitors program runaway or malfunction, therefore, some contrivance is necessary to prevent the monitoring circuit from initializing (restarting) the microcomputer or from performing another special operation at the time of self-programming.

According to the prior art, the monitor signal that the microcomputer outputs to the monitoring circuit when a normal operation other than self-programming is being performed is halted when the microcomputer executes self-programming. Specifically, there is a prior-art technique to input a dummy monitor signal, instead of the above-mentioned monitor signal, to the monitoring circuit from an external device, thereby exercising control that prevents the monitoring circuit from generating the abnormality detection signal.

An example of such control is performed by a control apparatus disclosed in, e.g., the specification of Japanese Patent Laid-Open (KOKAI) Publication JP-A-7-271634. The control apparatus includes a microcomputer for executing a control program, a reset circuit for monitoring a program-runaway monitoring signal and applying a reset signal to the microcomputer at the time of program runaway, a flash EEPROM in which various data, which includes the control program executed by the microcomputer, and a program for rewriting this program and data have been stored, and a rewrite unit for writing new data to the flash EEPROM, wherein the control apparatus is provided with a signal input circuit for externally applying the microcomputer-runaway monitoring signal to the reset circuit during the writing of new data and programs to the flash EEPROM by the rewrite unit.

SUMMARY OF THE DISCLOSURE

However, in the course of investigations toward the present invention, the following problems have been encountered.

This conventional arrangement for inputting a dummy monitor signal to the monitoring circuit from an external device to thereby perform control so as to prevent the abnormality detection signal from being generated by the monitoring circuit gives rise to some problems, set forth below.

The first problem is that it is necessary to add on external circuitry for the purpose of externally generating the dummy monitor signal. These leads to a greater number of component parts.

The second problem is that since the dummy monitor signal is input from the outside, noise is propagated with the input signal, leading to the possibility of unstable operation.

Accordingly, an object of the present invention is to provide a method and apparatus that make it possible to execute self-programming without a monitoring circuit shutting down or initializing (restarting) a microcomputer or causing some other special operation to occur at execution of self-programming, namely rewriting of the content of a flash EEPROM via the control operation of the microcomputer.

Further objects of the present invention will become apparent in the entire disclosure.

According to an aspect of the present invention, there is provided a method of controlling writing of a non-volatile memory electrically writable by a microcomputer, wherein when content of an electrically writable non-volatile memory for storing programs and data is rewritten through self-programming via control by the microcomputer, a monitoring circuit for monitoring runaway or malfunction of a program executed by the microcomputer performs control to inhibit output of an abnormality detection signal from the monitoring circuit based upon values of an externally entered write-enable signal for enabling writing of the non-volatile memory and of a monitoring-circuit operation-control signal output from the microcomputer, thereby making it possible to rewrite the content of the non-volatile memory by the self-programming without shutting down or initializing the microcomputer.

Typically, the electrically writable non-volatile memory comprises a flash EEPROM.

In this case, a control apparatus has a flash EEPROM for storing programs and data, a monitoring circuit for monitoring program runaway and malfunction, and a microcomputer, the apparatus executing an operation (referred to as "self-programming") for rewriting the content of the flash EEPROM via control by the microcomputer, the monitoring circuit having means, to which are input an externally entered flash EEPROM write-enable signal and a monitoring-circuit operation-control signal output from the microcomputer, for controlling output/suppression of an abnormal detection signal based upon values possessed by these signals, wherein when the operation for rewriting the content of the flash EEPROM is executed via control by the microcomputer, the monitoring circuit makes it possible to execute the operation for rewriting the content of the flash EEPROM without shutting down or initializing the microcomputer.

According to a second aspect of the present invention, there is provided a control apparatus having at least a flash EEPROM for storing programs and data, a monitoring circuit monitoring program runaway and malfunction, and a microcomputer, the control apparatus executing self-programming, i.e., rewriting the content of the flash EEPROM via control performed by the microcomputer. The monitoring circuit comprises means, to which are input an externally entered flash EEPROM write-enable signal and a monitoring-circuit operation-control signal output from the microcomputer, for controlling output/suppression of an abnormal detection signal based upon values possessed by these signals; wherein when rewriting of the content of the flash EEPROM is executed via control by the microcomputer, the monitoring circuit enables to rewrite the content of the flash EEPROM without shutting down or initializing the microcomputer.

In a specific embodiment herein, the monitoring circuit comprises:

a watchdog timer for outputting the abnormality detection signal; and means, to which are input the externally entered flash EEPROM write-enable signal and the monitoring-circuit operation-control signal output from the microcomputer, for exercising control so as to inhibit the watchdog timer from outputting the abnormality detection signal.

According to a third aspect of the present invention, there is provided a control apparatus comprising: a flash EEPROM for storing programs and data; a microcomputer; and a monitoring circuit having a watchdog timer, wherein in a case where the watchdog timer receives a monitor signal from the microcomputer, resets its count, starts counting a clock and is supplied with the monitor signal from the microcomputer before attaining a predetermined count, the watchdog timer resets its count and starts counting the clock again; and in a case where the watchdog timer receives the monitor signal from the microcomputer, resets its count, starts counting the clock and the attains the predetermined count without input of the monitor signal from the microcomputer, the watchdog timer outputs an abnormality detection signal;

content of the flash EEPROM being rewritten via a control operation performed by the microcomputer;

the monitoring circuit having control means, to which are input an externally entered flash EEPROM write-enable signal and a monitoring-circuit operation-halt signal output from the microcomputer, for exercising control so as to inhibit the watchdog timer from outputting the abnormality detection signal when the monitoring-circuit operation-halt signal is active;

wherein when rewriting of the content of the flash EEPROM is executed via control by the microcomputer, the monitoring circuit enables to rewrite the content of the flash EEPROM without outputting the abnormality detection signal to the microcomputer and, hence, without shutting down or initializing the microcomputer.

In a specific embodiment herein, the control means is capable of setting the monitoring-circuit operation-halt signal from an inactive state to the active state only when the externally entered flash EEPROM write-enable signal is active.

According to a fourth aspect of the present invention, there is provided a microcomputer internally incorporating: a flash EEPROM for storing programs and data; a processor; a monitoring circuit having a watchdog timer, wherein in a case where the watchdog timer receives a monitor signal from the processor, resets its count, starts counting a clock and is supplied with the monitor signal from the processor before attaining a predetermined count, the watchdog timer resets its count and starts counting the clock again; and in a case where the watchdog timer receives the monitor signal from the processor, resets its count, starts counting the clock and the attains the predetermined count without input of the monitor signal from the processor, the watchdog timer outputs an abnormality detection signal; and peripheral circuitry.

Content of the flash EEPROM is rewritten via a control operation performed by the processor.

The monitoring circuit has control means, to which are input an externally entered flash EEPROM write-enable signal and a monitoring-circuit operation-halt signal output from the processor, for exercising control so as to inhibit the watchdog timer from outputting the abnormality detection signal when the monitoring-circuit operation-halt signal is active; wherein when rewriting of the content of the flash EEPROM is executed via control by the processor, the monitoring circuit makes it possible to rewrite the content of the flash EEPROM without outputting the abnormality detection signal to the processor and, hence, without shutting down or initializing the processor.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 1 is a block diagram illustrating the construction of a first embodiment according to the present invention;

PREFERRED EMBODIMENTS OF THE INVENTION

Figure 2:
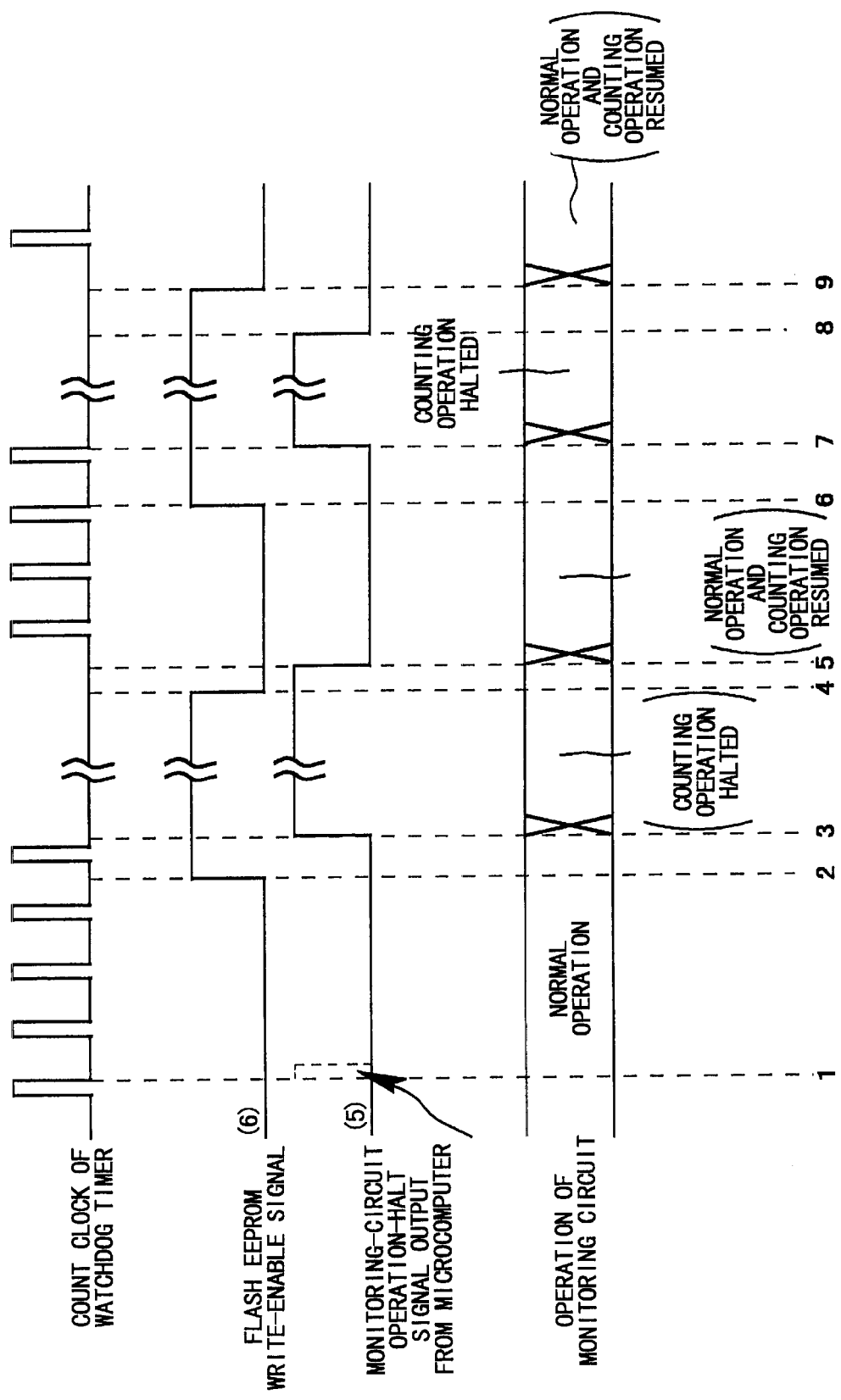
FIG. 2 is a timing chart for describing the operation of this embodiment.

According to a mode for practicing the present invention, there is provided a control apparatus having a flash EEPROM 3 storing various programs, such as a control program, and data, a monitoring circuit 2 monitoring program runaway and malfunction, a microcomputer 1 and peripheral circuits 4, wherein when an operation (self-programming) for rewriting the content of the flash EEPROM via a control operation of the microcomputer is executed, the monitoring circuit 2, on the basis of an externally entered flash EEPROM write-enable signal 6 and a monitoring-circuit operation-halt signal 5 output from the microcomputer 1, performs control to inhibit output of an abnormality detection signal 7 to the microcomputer 1, thereby making it possible to execute the operation for rewriting the content of the flash EEPROM 3 without halting operation of or initializing the microcomputer.

DETAILED DESCRIPTION OF THE EMBODIMENTS

Preferred embodiments of the present invention will now be described in detail more with reference to the accompanying drawings.

FIG. 1 is a block diagram illustrating the construction of a first embodiment according to the present invention. As shown in FIG. 1, the first embodiment includes a microcomputer (CPU) 1, a monitoring circuit 2 monitoring runaway or malfunction of the microcomputer 1, a flash EEPROM 3 in which a program for controlling the operation of the microcomputer 1 and data have been stored, and peripheral circuits 4 control led by the microcomputer 1 for interfacing external circuitry. According to this embodiment, the arrangement shown in FIG. 1 may be constructed as single-chip microcomputer as a matter of course.

Before self-programming, namely the rewriting of the content of flash EEPROM 3, by control exercised by the microcomputer 1, the peripheral circuits 4 and monitoring circuit 2 undergo a setting operation in accordance with a program that has been stored in the flash EEPROM 3.

Next, when the content of flash EEPROM 3 is rewritten via the control operation of the microcomputer 1, the latter performs an operation different from that of the program that has been stored in the flash EEPROM 3 and, therefore, the monitoring circuit 2 recognizes this as program runaway or malfunction and outputs an abnormality detection signal.

According to one embodiment of the present invention, however, the externally entered flash EEPROM write-enable signal 6 and the monitoring-circuit operation-control (halt) signal 5 output from the microcomputer 1 are input to the monitoring circuit 2, which then proceeds to control output/ suppression of the abnormality detection signal when the self-programming of the flash EEPROM 3 is carried out by the microcomputer 1.

The externally entered flash EEPROM write-enable signal 6, which is a signal input without the intervention of the microcomputer 1, enters the monitoring circuit 2 directly without being control led by the microcomputer 1

The monitoring-circuit operation-control signal 5 output from the microcomputer 1, on the other hand, is capable of being controlled by a program stored in the flash EEPROM 3 beforehand. That is, the microcomputer 1 controls the output of the monitoring-circuit operation-control signal 5 by reading out a control program, which has been stored in the flash EEPROM 3, to a RAM (main memory) incorporated in the microcomputer 1, and then executing the control program. More specifically, the monitoring-circuit operation-control. signal 5 is output from an output port of the microcomputer 1 by execution of a predetermined instruction by microcomputer 1.

FIG. 2 is a timing chart useful in describing operation in a case where a watchdog timer is used in the monitoring circuit 2 for outputting a signal at the moment the timer counts a number of clock pulses equivalent to a preset count. The operation of this embodiment will now be described with reference to FIGS. 1 and 2. In connection with FIG. 2, logical "1" and "0" are taken as being the active and inactive states, respectively.

Prior to time (1): The microcomputer 1 is operating normally.

Time (1): The monitoring-circuit operation control signal 5 output from the microcomputer 1 attempts to attain logical "1". However, since the externally entered flash EEPROM write-enable signal 6 is at logical "0", the ordinary operation of the watchdog timer constituting the monitoring circuit 2 is unaffected. The microcomputer 1, the watchdog timer of the monitoring circuit 2 and peripheral circuits 4 continue to operate as usual.

Time (2): Operation continues.

The externally entered flash EEPROM write-enable signal 6 is changed to logical "1". However, since the monitoring-circuit operation-control signal 5 output from the microcomputer 1 is logical "0", the ordinary operation of the watchdog timer is unaffected. The watchdog timer constituting the monitoring circuit 2 continues operating as usual and is capable of outputting he abnormality detection signal 7.

Time (3): Operation is halted.

The externally entered flash EEPROM write-enable signal 6 and the monitoring-circuit operation-control signal 5 output from the microcomputer 1 both attain logical "1". As a result, the watchdog timer constituting the monitoring circuit 2 stops counting, and a self-programming mode is started. It should be noted that the watchdog timer that has stopped counting also is no longer capable of generating the abnormality detection signal.

Time (4): The state of halted operation is maintained.

The externally entered flash EEPROM write-enable signal 6 reverts to logical "0" but the monitoring-circuit operation-control signal 5 output from the microcomputer 1 is at logical "1". As a result, the counting operation of the watchdog timer remains suspended. Since the watchdog timer remains inoperative, it cannot generate the abnormality detection signal.

Time (5): Operation is resumed.

The externally entered flash EEPROM write-enable signal 6 and the monitoring-circuit operation-control signal 5 output from the microcomputer 1 both revert to logical "0". Consequently, the watchdog timer resumes the counting operation, the self-programming operation ends and the microcomputer 1 is restored to normal operation. Since the watchdog timer resumes operation, it is capable of generating the abnormality detection signal.

Time (6): Operation continues.

Since the externally entered flash EEPROM write-enable signal 6 goes to logical "1" but the monitoring-circuit operation-control signal 5 output from the microcomputer 1 is at logical "0", operation continues in a manner similar to that at time (2).

Time (7): Operation is halted.

Operation here is similar to that at time (3).

Time (8): The state of halted operation continues.

The monitoring-circuit operation-control signal 5 output from the microcomputer 1 reverts to logical "0" but the externally entered flash EEPROM write-enable signal 6 is logical "1" As a result, the counting operation of the watchdog timer remains suspended. The watchdog timer that has stopped counting also is incapable of generating the abnormality detection signal.

Time (9): Operation is resumed.

The externally entered flash EEPROM write-enable signal 6 and the monitoring-circuit operation-control signal 5 output from the microcomputer 1 both revert to logical "0". Consequently, the watchdog timer resumes the counting operation, the self-programming operation ends and the microcomputer 1 is restored to normal operation. Since the watchdog timer resumes operation, it is capable of generating the abnormality detection signal A second embodiment of the present invention will now be described.

Figure 3:
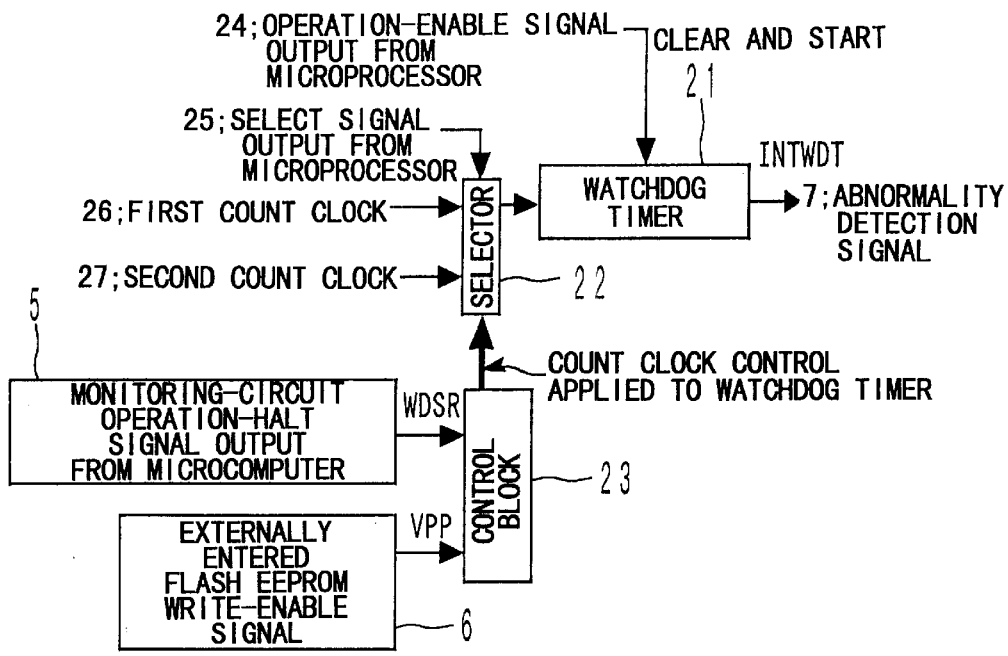
FIG. 3 is a block diagram showing the construction of a second embodiment of the present invention.

FIG. 3 is a diagram showing an example of a circuit arrangement in which the monitoring circuit 2 of the microcomputer is constituted by a watchdog timer.

As shown in FIG. 3, an externally entered flash EEPROM write-enable signal (VPP) 6 and a monitoring-circuit operation-control signal (WDSR) 5 output from the microcomputer 1 enter a control circuit (block) 23, which controls the count clock of a watchdog timer 21. On the basis of the VPP signal 6 and WDSR signal 5, the control circuit 23 controls the output of the abnormality detection signal (INTWDT) 7 issued by the watchdog timer 21. The abnormality detection signal (INTWDT) 7 enters the microcomputer 1 as a reset signal or interrupt signal.

The watchdog timer 21 will not stop counting the clock even when the VPP signal 6 is input to the count-clock control circuit 23. In order to halt the counting operation of the watchdog timer 21, the WDSR signal 5 from the microcomputer 1 is set to the active state, whereby the control circuit 23 controls a selector 22 in such a manner that the selector 22 will not output the count clock. The watchdog timer 21, therefore, stops counting. As a result, the watchdog timer 21 is inhibited from outputting the abnormality detection signal (INTWDT) 7, which is generated following recognition of program runaway or malfunction. When the WDSR signal 5 is active, the control circuit 23 controls the selector 22 in such a manner that the selector 22 fixes its output at logical "1"or "0".

When the WDSR signal 5 is inactive, the watchdog timer 21 receives an operation enable signal 24 output from the microcomputer 1, resets the count and starts counting the clock output from the selector 22. In a case where the operation enable signal 24 output from the microcomputer 1 enters the watchdog timer 21 before the watchdog timer overflows, the watchdog timer 21 resets the count and then starts the counting operation again, as a result of which overflow does not occur and the abnormality detection signal (INTWDT) 7 is not produced as an output. However, in a case where the operation enable signal 24 is not output from the microcomputer 1 within a predetermined period of time owing to program runaway or the like, the watchdog timer 21 overflows and outputs the abnormality detection signal (INTWDT) 7 to the microcomputer 1. Upon receiving the abnormality detection signal (INTWDT) 7, the microcomputer 1 is reset or executes predetermined interrupt processing.

The selector 22 responds to a select signal 25, which is output from the microcomputer 1, by selecting and outputting one of first and second count clocks 26, 27 of different frequencies. This is for the purpose of selecting the length of time until the watchdog timer 21 overflows. Thus, only one clock source would suffice. In this case, the count clock is supplied to the watchdog timer 21 via a switch, for example, and the control circuit 23 fixes the switch output at logical "1" or "0" when the WDSR signal 5 is active.

Figure 4:
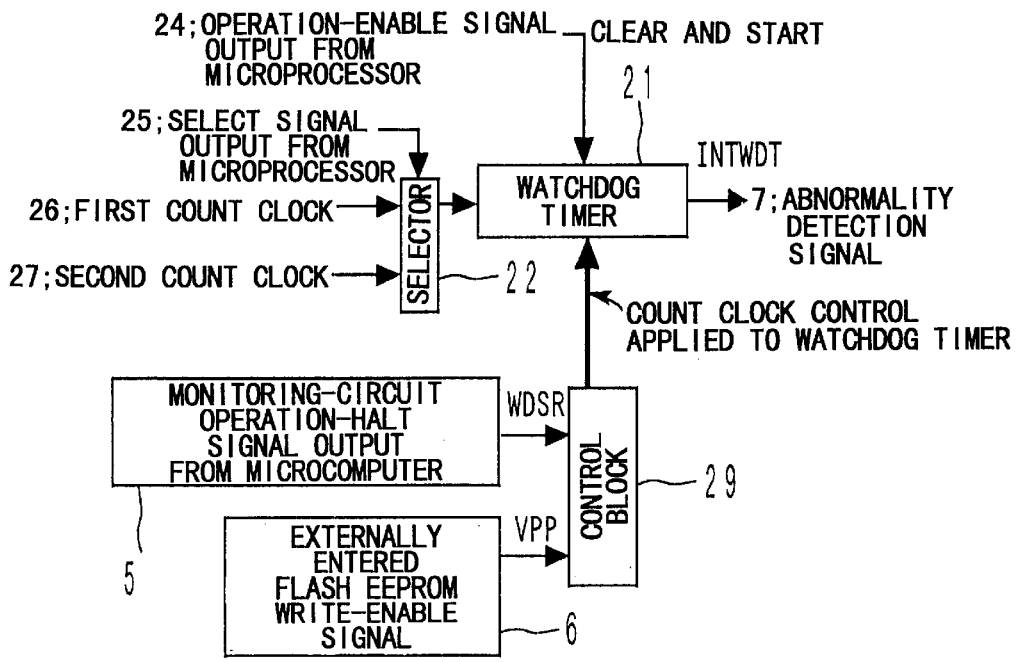
FIG. 4 is a block diagram showing the construction of a third embodiment of the present invention.

FIG. 4 is a diagram showing the construction of a third embodiment of the present invention.

As shown in FIG. 4, the third embodiment of the present invention includes an output control circuit 29 for controlling the output of the abnormality detection signal (INTWDT) 7 from the watchdog timer 21. The output control circuit 29 does not control the output of the selector 22, as is done in the second embodiment described above, but performs control to turn the output of the abnormality detection signal 7 in the watchdog timer 21 on or off using the VPP signal 6 and WDSR signal 5. Specifically, the watchdog timer 21 receives the operation enable signal 24 output from the microcomputer 1, resets the count and starts counting the clock output from the selector 22. Even if overflow occurs, the output of the abnormality detection signal (INTWDT) 7 is inhibited when the WDSR signal 5 is active.

It should be noted that each of the foregoing embodiments is ideal for use in the engine control unit of an automobile, by way of example.

Thus, in accordance with the present invention, as described above, output of an abnormality detection signal from a monitoring circuit is inhibited upon the rewriting of the content of a flash EEPROM via the operation of a microcomputer. This makes it possible to perform self-programming normally without shut-down or initialization of the microcomputer.

As many apparently widely different embodiments of the present invention can be made without departing from the spirit and scope thereof, it is to be understood that the invention is not limited to the specific embodiments thereof except as defined in the appended claims.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A method of controlling writing of a non-volatile memory electrically writable by a microcomputer, comprising:

(a) rewriting content of an electrically writable non-volatile memory for storing programs and data through self-programming via control by the microcomputer, and (b) upon said rewriting (a), controlling a monitoring circuit for monitoring runaway or malfunction of a program executed by said microcomputer to inhibit output of an abnormality detection signal from said monitoring circuit based upon values of an externally entered write-enable signal for enabling writing of said non-volatile memory and of a monitoring circuit operation-control signal output from said microcomputer, thereby making it possible to rewrite the content of said non-volatile member by said self-programming without shutting down or initializing said microcomputer.

2. A method of controlling writing of a flash EEPROM by a microcomputer, comprising:

(a) rewriting content of a flash EEPROM for storing programs and data through self-programming via control by the microcomputer, and (b) upon said rewriting (a) controlling a monitoring circuit for monitoring runaway or malfunction of a program executed by said microcomputer to inhibit output of an abnormality detection signal from said monitoring circuit based upon values of an externally entered flash EEPROM write-enable signal and of a monitoring-circuit operation-control signal output from said microcomputer.

3. A control apparatus comprising at least a flash EEPROM for storing programs and data, a monitoring circuit for monitoring program runaway and malfunction, and a microcomputer, said control apparatus executing self-programming for rewriting the content of said flash EEPROM via control performed by said microcomputer, said monitoring circuit having means, to which are input an externally entered flash EEPROM write-enable signal and a monitoring-circuit operation-control signal output from said microcomputer, for controlling output/suppression of an abnormal detection signal based upon values possessed by these signals;

wherein when rewriting of the content of said flash EEPROM is executed via control by said microcomputer, said monitoring circuit makes it possible to rewrite the content of said flash EEPRROM without shutting down or initializing said microcomputer.

4. The control apparatus according to claim 3, wherein said monitoring circuit comprises:

a watchdog timer for outputting the abnormality detection signal; and means, to which are input the externally entered flash EEPROM write-enable signal and the monitoring-circuit operation-control signal output from said microcomputer, for exercising control so as to inhibit said watchdog timer from outputting the abnormality detection signal.

5. A control apparatus comprising:

a flash EEPROM for storing programs and data;

a microcomputer; and a monitoring circuit having a watchdog timer, wherein in a case where said watchdog timer receives a monitor signal from said microcomputer, resets its count, starts counting a clock and is supplied with the monitor signal from said microcomputer before attaining a predetermined count, said watchdog timer resets its count and starts counting the clock again; and in a case where said watchdog timer receives the monitor signal from said microcomputer, resets its count, starts counting the clock and the attains the predetermined count without input of the monitor signal from said microcomputer, said watchdog timer outputs an abnormality detection signal;

content of said flash EEPROM being rewritten via a control operation performed by said microcomputer;

said monitoring circuit having control means, to which are input an externally entered flash EEPROM write-enable signal and a monitoring-circuit operation-halt signal output from said microcomputer, for exercising control so as to inhibit said watchdog timer from outputting the abnormality detection signal when the monitoring-circuit operation-halt signal is active; and wherein when rewriting of the content of said flash EEPROM is executed via control by said microcomputer, said monitoring circuit makes it possible to rewrite the content of said flash EEPROM without outputting the abnormality detection signal to said microcomputer and, hence, without shutting down or initializing said microcomputer.

6. A microcomputer internally incorporating:

a flash EEPROM for storing programs and data;

a processor;

a monitoring circuit having a watchdog timer; and peripheral circuitry;

wherein in a case where said watchdog timer receives a monitor signal from said processor, resets its count, starts counting a clock and is supplied with the monitor signal from said processor before attaining a predetermined count, said watchdog timer resets its count and starts counting the clock again; and in a case where said watchdog timer receives the monitor signal from said processor, resets its count, starts counting the clock and the attains the predetermined count without input of the monitor signal from said processor, said watchdog timer outputs an abnormality detection signal;

wherein content of said flash EEPROM is rewritten via a control operation performed by said processor;

wherein said monitoring circuit has control means, to which are input an externally entered flash EEPROM write-enable signal and a monitoring-circuit operation-halt signal output from said processor, for exercising control so as to inhibit said watchdog timer from outputting the abnormality detection signal when the monitoring-circuit operation-halt signal is active;

wherein when rewriting of the content of said flash EEPROM is executed via control by said processor, said monitoring circuit makes it possible to rewrite the content of said flash EEPROM without outputting the abnormality detection signal to said processor and, hence, without shutting down or initializing said processor.

* * * * *